United States Patent
Piercy et al.

(10) Patent No.: US 7,466,691 B2
(45) Date of Patent: Dec. 16, 2008

(54) ENHANCED CIRCUIT-SWITCHED MEDIA TRANSMISSION OVER IP ACCESS NETWORKS

(75) Inventors: Neil Piercy, Cambridge (GB); Nick Johnson, Cambridge (GB)

(73) Assignee: IP Access Ltd, Cambridge (GB)

( * ) Notice: Subject to any disclaimer, the term of this patent is extended or adjusted under 35 U.S.C. 154(b) by 0 days.

(21) Appl. No.: 10/547,901

(22) PCT Filed: Mar. 8, 2004

(86) PCT No.: PCT/GB2004/000949

§ 371 (c)(1),
(2), (4) Date: Jan. 11, 2007

(87) PCT Pub. No.: WO2004/080018

PCT Pub. Date: Sep. 16, 2004

(65) Prior Publication Data

US 2007/0147342 A1    Jun. 28, 2007

(30) Foreign Application Priority Data

Mar. 7, 2003    (GB)    ................. 0305254.5

(51) Int. Cl.
*H04L 12/28*    (2006.01)
*H04L 12/56*    (2006.01)
*H04L 12/66*    (2006.01)

(52) U.S. Cl. ....................... 370/352; 370/401
(58) Field of Classification Search ......... 370/352–356, 370/401
See application file for complete search history.

(56) References Cited

U.S. PATENT DOCUMENTS

| 6,385,179 | B1 | 5/2002 | Malcolm et al. |
| 7,167,467 | B2 * | 1/2007 | Iwami et al. ................. 370/352 |
| 2002/0075846 | A1 * | 6/2002 | Valentine et al. ............ 370/352 |
| 2004/0120502 | A1 * | 6/2004 | Strathmeyer et al. ... 379/265.01 |

FOREIGN PATENT DOCUMENTS

| WO | WO 01 60023 A | 8/2001 |
| WO | WO 02 25982 A | 3/2002 |

\* cited by examiner

*Primary Examiner*—Harry S Hong
(74) *Attorney, Agent, or Firm*—Drinker, Biddle & Reath LLP

(57) ABSTRACT

An enhanced circuit-switched media transmission over packet-switched, or Internet Protocol, access networks. Access legs of calls between terminal devices are monitored at a gateway positioned at the interface between packet-switched and circuit-switched networks. Access legs are identified which connect terminal devices residing in the same access network through monitoring of media data transmission. Terminal devices with identified connections are instructed to communicate directly while the gateway maintains the connection on the circuit-switched network.

19 Claims, 3 Drawing Sheets

ENHANCED CIRCUIT-SWITCHED MEDIA TRANSMISSION OVER IP ACCESS NETWORKS

CROSS-REFERENCE TO RELATED APPLICATIONS

This application is a U.S. national phase of PCT/GB2004/000949 filed 8 Mar. 2004, which has a priority date of 7 Mar. 2003.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

FIELD OF THE INVENTION

The present invention relates to enhanced circuit-switched media transmission over packet-switched access networks and in particular, but not exclusively, Internet Protocol (IP) access networks.

BACKGROUND OF THE INVENTION

In a traditional circuit-switched telecommunications network the voice stream, or, more generally, user media stream, is carried from an end terminal, such as a telephone, to a first point of switching, such as a Local Exchange, in fixed circuits or trunks, commonly termed an access network. The first point of switching forms the boundary of the so-called core network.

The circuit between the end terminal and the first point of switching may be an expensive commodity. The end terminal and the first point of switching may be separated by considerable distance. This is especially true in rural areas where it is not cost-effective to place a switch locally, thus requiring the transmission of media over long distances.

Where the cost of transmission is very high, such as with satellite links, compression schemes may be used on both voice and more general data streams.

In addition, there may be access network bandwidth aggregation or multiplex equipment between the terminal and the switch, so that only media streams with active connections occupy the available circuits Furthermore, there may be such schemes as Digital Communications Multiplex Equipment (DCME), which use voice activity detection to "share" the available circuits over active connections by carrying only active speech, and not silence periods. These schemes do not however alter the fundamental issue: there is a circuit media stream between the terminal and the switch whilst this terminal is active.

In many cases this access network transmission is fundamentally necessary. For example, if two end terminals which are connected by a call are in different locations, the media must be carried over the remote transmission link.

In some cases, however, the connection may be between two end terminal devices which share the same first point of switching. Both end connections will be connected by the same transmission link to the same switch. The media associated with the call is carried to the switch and then back again, occupying the transmission link for two connections, due to the first point of switching being remote.

In a packet-switched network, such as an IP network, using a so-called soft-switch architecture, the above problem may be eliminated. Although the low bandwidth call signalling from both terminals must be carried across the transmission link to the remote soft switch, the end terminals are controlled by the soft switch to send their higher bandwidth user media streams directly to the other end terminal. If both terminals are on the same end of the same transmission link, the media does not traverse the link, saving the possibly expensive link costs.

There are now several hybrid options between packet-switched and circuit-switched networks, one of which uses a packet-switched access network with a circuit-switched core network. This hybrid option utilises a gateway device between the two domains situated adjacent to the core network switch.

A reason for the move to a hybrid option is that in some circumstances it may be undesirable to modify the core network from circuit-switched to soft-switched. This may be due to the large investment in the capital cost, training, configuration, etc. of the switch, which is often a significant part of the overall costs of a telecommunications operator.

In such cases the operator would currently have to bare the costs of transmission for the local calls described above, even though the end terminals have the capability to route their media streams directly for local calls. This is because the switch is fundamentally the first point in the network to know the fact that the two access connections or legs of a call are indeed part of the same call, and thus may be directly connected.

An example of where the above situation exists is in a GSM (Global System for Mobile communications) network. Most GSM PLMN (Public Land Mobile Network) operators today have traditional circuit-switched Mobile Switching Centres (MSC), but some deploy IP-based Base Station Systems (BSS) (the access network for GSM), which are composed of a Base Station Controller (BSC) and Base Transceiver System (BTS). The BSC connects to the MSC using traditional E1 or Ti circuits and includes the gateway between the circuit-switched core network and the IP access network. The BSC and BTSs do not know if any of the connections they are carrying between the MSC and the BTSs (for onward connection to the Mobile Station (MS)) are part of the same call or not.

BRIEF SUMMARY OF THE INVENTION

An enhanced circuit-switched media transmission over packet-switched, or Internet Protocol, access networks is disclosed. Access legs of calls between terminal devices are monitored at a gateway positioned at the interface between packet-switched and circuit-switched networks. Access legs are identified which connect terminal devices residing in the same access network through monitoring of media data transmission. Terminal devices with identified connections are instructed to communicate directly while the gateway maintains the connection on the circuit-switched network.

DETAILED DESCRIPTION OF THE INVENTION

Figure 1:
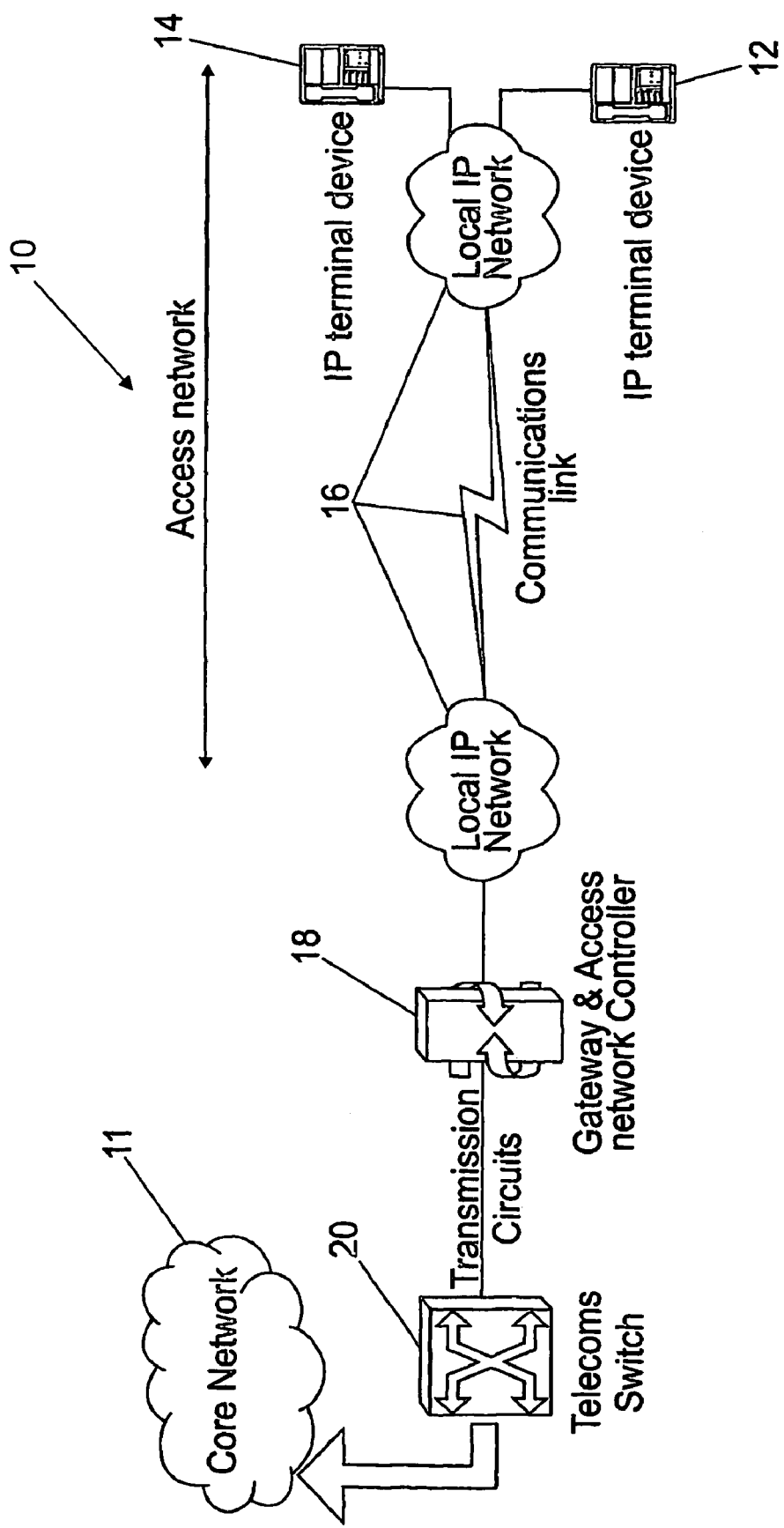
FIG. 1 is a diagram of a packet-switched access network with a gateway and switch to a circuit-switched core network.

According to a first aspect of the present invention, there is provided a method of handling circuit-switched media transmission over packet-switched access networks having a plurality of terminal devices, a gateway and a switch, the method comprising the steps of:

(i) monitoring the switch at the gateway, wherein the switch has a plurality of access legs for carrying a plurality of media data streams to and from a plurality of terminal devices;

(ii) comparing at least two media data streams at the gateway;

(iii) determining if a first media data stream at the gateway corresponds to a second media stream at the gateway;

(iv) instructing a first terminal device transmitting the first media data stream and a second terminal device transmitting the second media data stream to communicate directly on successful determination in step (iii); and (v) ceasing transmission to the switch of the first and second media data streams from the first and second terminal devices.

Preferably, the method further comprises the step of transmitting a test pattern in place of the transmission data stream from the gateway.

Transmitting a test pattern ensures that a connection between the first terminal device and the second terminal device is still available.

Preferably, the method further comprises the step of monitoring control messages from the first and second terminal devices.

Preferably, the step of monitoring the switch at the gateway passively monitors the access legs by comparing the media data stream on each access leg.

Preferably, when a new access leg is created, the method ceases monitoring already connected access legs in relation to the new access leg.

Further preferably, the method does not monitor future new access legs which are connected outside a threshold time value from the new access leg.

Alternatively, the method further comprises the step of injecting data, wherein access legs are injected with test information and access legs are monitored for this known test information.

Preferably, the test information is at least one Dual Tone Multi-Frequency (DTMF) signal.

Alternatively, the test information is a user-user message.

A user-user message may be sent in many modern signalling protocols such as ISDN (Integrated Services Digital Network) and GSM (Global System for Mobile communications).

Preferably, the method comprises the step of detecting that the test pattern is no longer being received on an access leg.

Preferably, the method comprises the step of instructing the first terminal device or second terminal device to transmit to the gateway with any further data transmissions when the monitoring step indicates that the test pattern is no longer being received.

According to a second aspect of the present invention, there is provided a packet-switched access network comprising:
- a plurality of terminal devices;
- a gateway comprising a data monitoring means, wherein the gateway is adapted to communicate with a switch of a circuit-switched core network; and
- a plurality of access legs each enabled to carry media data streams between terminal devices,
- wherein the data monitoring means for monitoring each access leg to find an internal connection having an internal media data stream between a first terminal device and a second terminal device in the access network, the gateway adapted to instruct the first and second terminal devices to communicate the internal media data stream directly across the access network.

According to a third aspect of the present invention, there is provided a gateway for enabling communication between a packet-switched access network and a circuit-switched core network, the gateway comprising:
- a plurality of access legs each enabled to carry data streams between the access network and the core network;
- data stream monitoring means for monitoring each access leg to find an internal connection having a data stream between a first terminal device and a second terminal device in the access network;
- access network control means for instructing the first terminal device and the second terminal device of the internal connection to transmit and receive the data stream directly across the access network.

Preferably, the gateway further comprises a gateway transmission means, wherein the gateway transmits a test data stream to the circuit-switched core network in place of the media data stream of the internal connection.

By transmitting a test data stream, the gateway enables the internal connection to remain open. The data stream of the internal connection is no longer passed to the gateway but rather across the packet-switched access network. In this way, the bandwidth associated with the internal connection is used more efficiently.

Preferably, the data monitoring means monitors the access legs passively by comparing the data stream on each access leg.

Preferably, when a new access leg is created, the data monitoring means ceases monitoring already connected access legs in relation to the new access leg.

Further preferably, the data monitoring means does not monitor future new access legs which are connected outside a threshold time value from the new access leg.

Alternatively, the gateway further comprises a data injection means wherein access legs are injected with test information and access legs are monitored for this known test information.

Preferably, the test information is at least one Dual Tone Multi-Frequency (DTMF) signal.

Alternatively, the test information is a user-user message.

Preferably, the data monitoring means is adapted to detect that the test pattern is no longer being received on an access leg.

Preferably, the access network control means is enabled to instruct the first terminal device or second terminal device to transmit to the gateway with any further data transmissions when the data monitoring means indicates that the test pattern is no longer being received.

Figure 2:
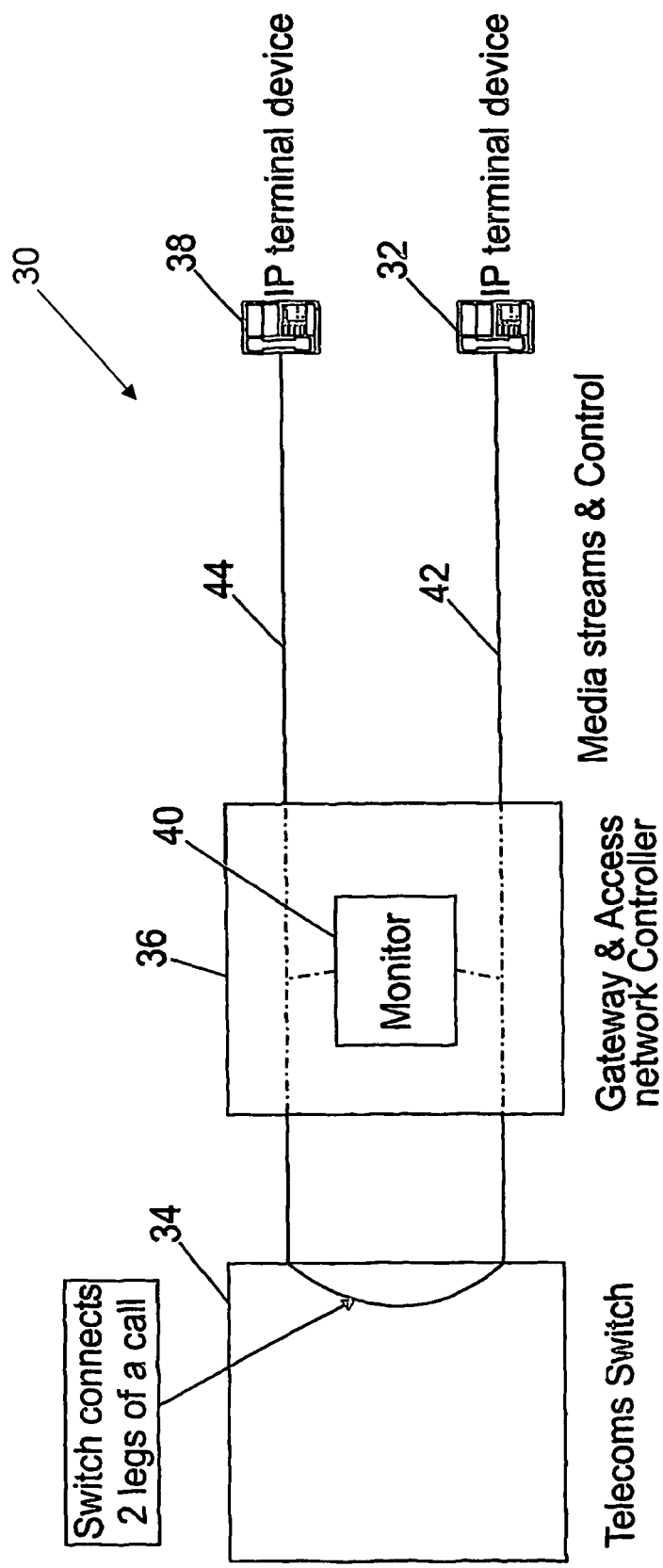
FIG. 2 is a diagram of a packet-switched access network according to an embodiment of the invention.
Figure 3:
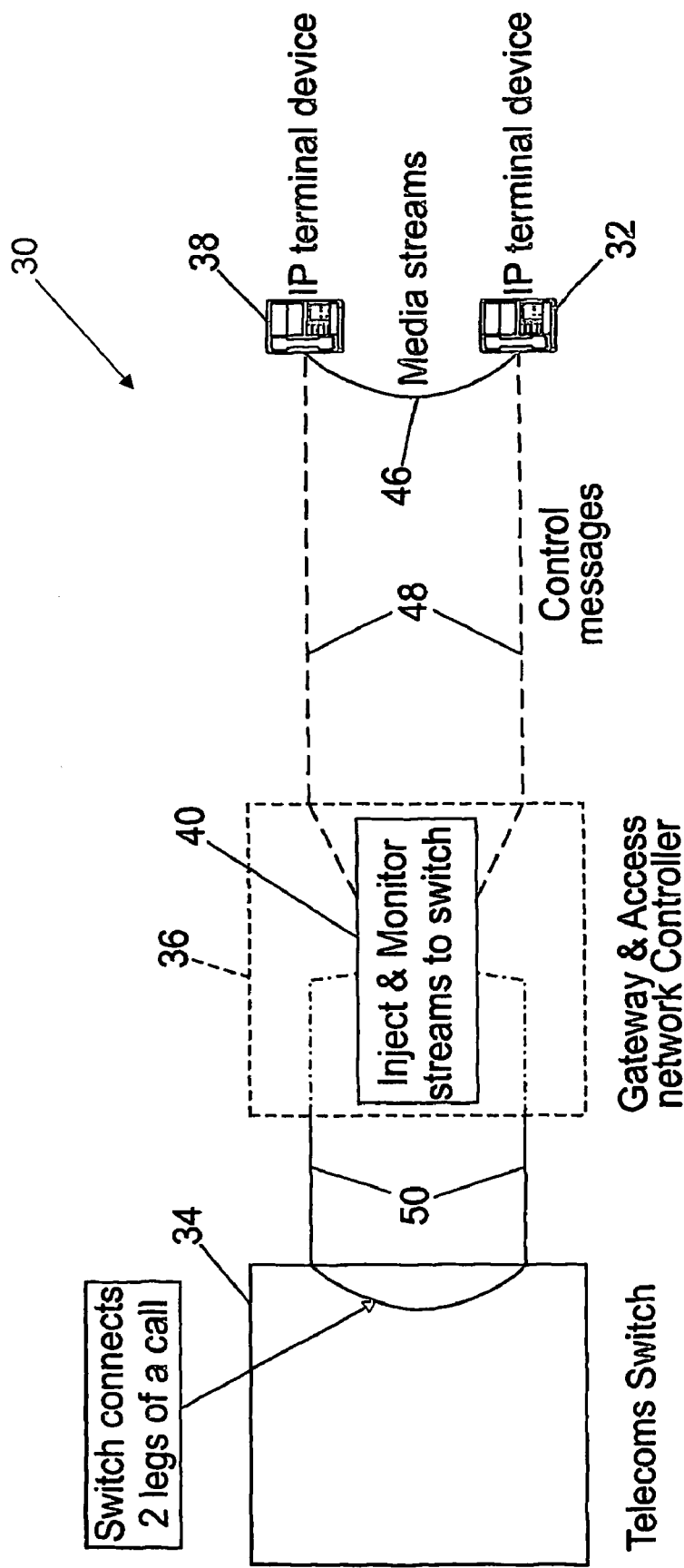
FIG. 3 is a diagram of a packet-switched access network according to another embodiment of the invention.

The present invention will now be described with reference to the following drawings in which:

FIG. 1 shows a typical packet-switched access network with a gateway and switch to a circuit-switched core network;

FIG. 2 shows a packet-switched access network according to the invention, including media data streams and terminal devices in the same access network; and FIG. 3 shows a packet-switched access network according to the invention, wherein the gateway has enabled the media data stream to be communicated within the access network.

Referring to FIG. 1, a packet-switched access network 10 allows terminal devices 12, 14 to connect through an IP network 16 to a gateway 18. The gateway 18 provides a single point to connect the packet-switched access network 10 to a circuit-switched core network 11 through a switch 20.

When used in a known manner, a terminal device 12, 14 connects with a remote terminal device (not shown) in a remote access network (not shown) through the access network 10, gateway 18, switch 20 and circuit-switched core network 11.

Referring now to FIG. 2, a packet-switch access network 30 according to the invention has a first terminal device 32, a gateway 36, a switch 34 and a second terminal device 38. The gateway 36 has a monitor 40 for monitoring data streams through the gateway 36.

The switch 34 has a plurality of access legs for carrying a plurality of media data streams to and from a plurality of terminal devices. For example, in the event that the first terminal device 32 wishes to call the second terminal device 38, the first terminal device 32 instigates a first access leg 42 to the second terminal device 38. As the first terminal device 32 and the second terminal device 38 are within the same access network 30 a second access leg 44 is also created.

The monitor 40 monitors all access legs through the gateway 36. The monitor 40 looks for access legs carrying matching data streams. In this case, the second access leg 44 is matched to the first access leg 42.

In its simplest form, the gateway 36 could passively monitor all data streams to and from the switch 34, and by comparing each transmitted stream with each received stream, determine which (if any) of the access legs 42, 44 are connected by the switch 34.

FIG. 3 depicts a situation were the monitor 40 has identified matching access legs and, as such, uses like reference numerals where appropriate.

Once the monitor 40 has identified that the media stream on the second access leg 44 (FIG. 2) matches the media stream on the first access leg 42 (FIG. 2), the first terminal device 32 is instructed to communicate directly with the second terminal device 38 across the access network 30. A direct data stream 46 is created avoiding transmitting the majority of the data through the gateway 36 and switch 34.

In doing this, the media streams for the call are now routed locally through the access network 30 between the first and second terminal devices 32, 38.

The first terminal device 32 and the second terminal device 38 are enabled to continue to send and receive control signals 48 to and from the gateway 36 to monitor the activity of the first and second terminal devices 32, 38.

The monitor 40 also transmits a test data stream 50 enabling the switch 34 to keep original access legs connected. If the continued monitoring of the access legs indicates that the switch 34 is no longer connecting the access legs 50 together, the gateway 36 reverses the actions taken above to reconnect both the access legs 42,44 to their correct switch circuits across the access transmission link.

The monitor 40 may also use other methods other than to simply passively monitor access legs. For example, the monitor may use any or a combination of the following methods 1. injection of known signal: rather than passively monitor the media streams transmitted towards the switch, inject a signal which is robust to the possible processing within the switch, and is easily detectable within the gateway. For voice media, the existing in-band signals such as DTMF may be used. Whilst these are potentially disruptive to the communications, they may be injected periodically, only during the initial establishment of the connections, or only during periods of silence. They have the advantage of being easy to detect and being unaffected by all standard voice compression and echo cancellation equipment (as such equipment must pass DTMF for correct operation of other systems). This does not prevent the N-squared scalability issue, but it makes the basic processing much simpler.

2. signalling monitoring—setup time relationship: most calls are simple point-to-point connections which are established directly and only involve the two end terminals. As such, there is a well-defined window of time during the setup of the originating access leg when the terminating access leg is established. Using this narrow window of time it is possible for each originating call leg to determine possible candidates for the terminating call leg. These candidates may then be checked using the above techniques. Whilst this still leaves an N-squared problem, for typical connections the time window is only about 1 second, which coupled with an average inter-call gap on a trunk of around five minutes, gives a decrease by a factor of 300 the number of possible links to be tested for connection. It should be noted that for remote transmission links there are unlikely to be a large number of trunk circuits (as otherwise it would be economic to place a small switch locally to solve this problem), so this reduction in number of calculations may in itself be sufficient to make the processing requirements tractable.

3. Signalling injection: in many modern signalling protocols (e.g. ISDN, GSM) it is possible to carry user-user information in the call signalling messages, both at the first setup message and in some later messages, including a specific message which may only carry user-user information. The gateway may add such user-user information to the setup or other later message or send a separate user-user message, and if it receives this same information returning on another access leg, consider these as candidates for connection, and either test the media stream as above, or proceed directly to the transmission bypass and continued monitoring (as the continued monitoring would again break the bypass and reconnect the media if the signalling had unusually not determined the correct connection between the access legs.

In addition, some connections between packet-switched access networks and circuit-switched core networks have specialist features which may be disrupted by the present invention. These can be dealt with by modification of the manner in which access legs are monitored. For example:

Multi-Party Calls

In multi-party calls (e.g. conference calls) the media stream from each party is sent to a conference bridge or mixer, which mixes, selects or otherwise combines the speech from the multiple terminal users, and produces a single combined "talk stream" which is then broadcast to all participants. The simple stream monitoring technique would potentially cause two local participants of the call to be "cut off" from the other parties. The continued monitoring would however detect the conference mixer/bridge switching the other participants into the talk stream, and thus that the bypassed participants were not uniquely part of a single point-to-point call. The use of the timing or signalling injection enhancements would also prevent such calls being interpreted as point-to-point calls, as each participant joins the bridge independently: the call is actually between each participant and the conference bridge.

In-Call Modification of Path/Call

Modern call signalling protocols (e.g. ISDN, GSM) include in-call supplementary services which can modify the routing and participants in a call during the call. A good example is placing a call on hold or adding a third participant to the call. All of these scenarios could be detected by the normal audio monitoring, or by continued monitoring of the call signalling to determine when supplementary services have been invoked.

Further modifications and improvements may be incorporated without departing from the scope of the invention.

The invention claimed is:

1. A method of handling circuit-switched media transmission over packet-switched access networks having a plurality of terminal devices, a gateway that operably couples a packet-switched access network to a circuit switched network wherein the circuit switched network comprises a circuit switch, the method comprising the steps of:
   (i) monitoring at the gateway a plurality of circuit-switched data streams passing between the gateway and the circuit switch to and from a plurality of terminal devices;
   (ii) comparing at least two data streams of the plurality of circuit-switched data streams at the gateway;
   (iii) determining at the gateway whether a first data stream of the at least two data streams and a second data stream of the at least two data streams form a communication between a first terminal device operably coupled to the circuit switch and a second terminal device operably coupled to the circuit switch;
   (iv) instructing the first terminal device and the second terminal device to communicate directly, based on a successful determination in step (iii); and
   (v) ceasing transmission of the first data stream and second data stream between the gateway and the first terminal device and second terminal device based on a successful determination in step (iii).

2. The method as claimed in claim 1, further comprising at the gateway transmitting a test pattern in place of a data stream to the circuit switch.

3. The method as claimed in claim 1, comprising at the gateway monitoring control messages from the first terminal device and second terminal device.

4. The method as claimed in claim 1, wherein upon at least two new access legs being established within a threshold time value, the method comprises monitoring and comparing the at least two new access legs to determine whether the first data stream and the second data stream communicated on the at least two new access legs form the communication between the first terminal device and the second terminal device.

5. The method as claimed in claim 1, further comprising injecting test information into at least one circuit-switched data stream and wherein monitoring comprises monitoring at least one further data stream for the test information.

6. The method as claimed in claim 5, wherein the test information is at least one Dual Tone Multi-Frequency (DTMF) signal in at least one of the first data stream and the second data stream.

7. The method as claimed in claim 1, further comprising injecting test information into at least one of two new access legs that have been established wherein the test information is a user-user message in a call control message associated with at least one of the first data stream and the second data stream.

8. The method as claimed in claim 2, wherein the method comprises detecting whether the test pattern is no longer being received on an access leg.

9. The method as claimed in claim 8, further comprising instructing at least one of the first terminal device and the second terminal device to transmit further data transmissions to the gateway when the test pattern is no longer being received by the gateway on the access leg.

10. A gateway for enabling communication between a packet-switched access network and a circuit-switched core network comprising a circuit switch, the gateway comprising:
    data stream monitoring means for monitoring a plurality of circuit-switched data streams between a plurality of terminal devices passing through the gateway via the circuit switch and arranged to determine whether a first data stream and a second data stream of the plurality of circuit-switched data streams form a communication between a first terminal device and a second terminal device of the plurality of terminal devices in the packet-switched access network;
    packet-switched access network control means for:
        instructing the first terminal device and the second terminal device to transmit and receive the first data stream and second data stream directly to one another across the packet-switched access network; and
        ceasing transmission of the first data stream and second data stream between the gateway and the first terminal device and second terminal device, based on a determination that the first data stream and second data stream form the communication between the first terminal device and the second terminal device.

11. The gateway as claimed in claim 10 further comprising gateway transmission means such that ceasing transmission of the first data stream and second data stream comprises the gateway transmission means transmitting a test data stream to the circuit-switched core network.

12. The gateway as claimed in claim 10, wherein upon at least two new access legs being established within a threshold time value, the data monitoring means is arranged to monitor the at least two new access legs and ceases monitoring at least one already connected access leg.

13. The gateway as claimed in claim 12, wherein the data monitoring means is arranged to monitor the at least two new access legs only when connected within a threshold time value.

14. The gateway as claimed in claim 10, wherein the gateway further comprises data injection means arranged to inject test information into at least one circuit-switched data stream and wherein monitoring comprises monitoring the plurality of circuit-switched data streams for the test information.

15. The gateway as claimed in claim 14, wherein the test information is at least one Dual Tone Multi-Frequency (DTMF) signal in at least one of the first data stream and the second data stream.

16. The gateway as claimed in claim 10, wherein the gateway further comprises data injection means arranged to inject test information into at least one of two access legs established wherein the test information is a user-user message in a call control message associated with at least one of the first data stream and the second data stream.

17. The gateway as claimed in claim 12, wherein the data monitoring means is adapted to detect whether a test pattern is no longer being by the gateway received on an access leg.

18. The gateway as claimed in claim 17, wherein, the access network control means is enabled to instruct at least one of the first terminal device and the second terminal device to transmit to the gateway with any further data transmissions when the data monitoring means indicates that the test pattern is no longer being received by the gateway.

19. A packet-switched access network comprising:

a plurality of terminal devices;

a gateway comprising data stream monitoring means, wherein the gateway is adapted to communicate with a circuit switch in a circuit-switched core network; and wherein the data stream monitoring means is arranged to monitor a plurality of circuit-switched data streams between the plurality of terminal devices passing through the gateway via the circuit switch and determine whether a first data stream and a second data stream of the plurality of circuit-switched data streams form a communication between a first terminal device and a second terminal device of the plurality of terminal devices in the packet-switched access network, wherein the gateway is adapted to instruct the first terminal device and the second terminal device to communicate the first data stream and second data stream directly to one another across the packet-switched access network and ceases transmission of the first data stream and second data stream to the circuit switch, based on a determination that the first data stream and second data stream form the communication between the first terminal device and the second terminal device.

\* \* \* \* \*